United States Patent
Kwon et al.

(10) Patent No.: US 7,083,380 B2
(45) Date of Patent: Aug. 1, 2006

(54) SEPARABLE DISTRIBUTION ROTOR AND HORIZONTAL ROTOR DISTRIBUTOR HAVING THE SAME

(75) Inventors: Soon-Mok Kwon, Seoul (KR); Seong-Ho Han, Inchon (KR)

(73) Assignee: Soon-Mok Kwon (KR)

( * ) Notice: Subject to any disclaimer, the term of this patent is extended or adjusted under 35 U.S.C. 154(b) by 188 days.

(21) Appl. No.: 10/892,302

(22) Filed: Jul. 15, 2004

(65) Prior Publication Data

US 2005/0013687 A1 Jan. 20, 2005

(30) Foreign Application Priority Data

Jul. 18, 2003 (KR) ...................... 10-2003-0049240

(51) Int. Cl.
*F04D 31/00* (2006.01)
(52) U.S. Cl. .................................. 415/116; 416/198 R
(58) Field of Classification Search ................ 415/115, 415/143; 416/175, 194, 198 R; 110/246; 432/180–182
See application file for complete search history.

(56) References Cited

U.S. PATENT DOCUMENTS

| 5,562,442 A | 10/1996 | Wilhelm ...................... 432/72 |
| 5,692,892 A * | 12/1997 | Houston ..................... 432/181 |
| 5,871,349 A * | 2/1999 | Johnson et al. ............. 432/180 |
| 6,203,316 B1 | 3/2001 | Pennington ................. 432/180 |

FOREIGN PATENT DOCUMENTS

| JP | 2001-74225 | 3/2001 |
| KR | 2002-0025915 | 4/2002 |
| KR | 20-0280797 | 6/2002 |
| KR | 10-2003-0000211 | 1/2003 |
| KR | 10-2003-0013311 | 3/2003 |
| KR | 10-2003-0013312 | 3/2003 |

* cited by examiner

*Primary Examiner*—Edward K. Look
*Assistant Examiner*—Devin Hanan
(74) *Attorney, Agent, or Firm*—Cantor Colburn LLP

(57) ABSTRACT

A separable distribution rotor and a horizontal rotor distributor having the same. The separable distribution rotor includes a first distribution rotor, a second distribution rotor, and an elastic member interposed between the first distribution rotor and the second distribution rotor.

6 Claims, 4 Drawing Sheets

SEPARABLE DISTRIBUTION ROTOR AND HORIZONTAL ROTOR DISTRIBUTOR HAVING THE SAME

BACKGROUND OF THE INVENTION

1. Field of the Invention

The present invention relates to a separable distribution rotor and a horizontal rotor distributor having the same, and more particularly to a separable distribution rotor, which is divided into two distribution rotors, and a horizontal rotor distributor having the same.

2. Description of the Related Art

Conventionally, horizontal rotor distributors are employed by regenerative thermal oxidizers for igniting and purifying volatile organic compounds (VOC).

U.S. Pat. Nos. 5,562,442 and 6,203,316, Japanese Patent Laid-open No. 2001-74225 (dated Mar. 23, 2001), Korean Utility Model Reg. No. 280797 filed by the present applicant, Korean Patent Laid-open No. 2002-25915 (dated Apr. 4, 2002), and Korean Patent application No. 2003-211 disclose regenerative thermal oxidizers.

Since each of the regenerative thermal oxidizers which are disclosed by the above U.S. patent documents and Japanese Patent Laid-open documents, has a vertical rotor distributor, it is not easy to separate a distribution rotor, formed integrally with the vertical rotor distributor, from the vertical rotor distributor.

On the other hand, each of the regenerative thermal oxidizes which are disclosed by the above Korean Utility Model and patent documents, has a horizontal rotor distributor. A distribution rotor is also formed integrally with such a horizontal rotor distributor.

The distribution rotor formed integrally with the rotor distributor requires a separate packing. It is difficult to effectively use the packing due to the high temperature of the regenerative thermal oxidizer.

Further, in case that the distribution rotor is separated from the rotor distributor in order to clean, repair and replace the distribution rotor, a shaft must be taken out of the distribution rotor. Here, it is difficult to separate the shaft from the distribution rotor due to the operation of the distribution rotor at a high-temperature condition.

Further, when the distribution rotor is taken out of the housing, the heavy housing, which supports the shaft, must be supported and suspended by a loop, thereby causing troublesomeness to workers.

Moreover, when the distribution rotor is assembled with the rotor distributor as well as when the distribution rotor is separated from the rotor distributor, the support of the rotor distributor is performed, and the center of the shaft of the distribution rotor is fitted into a proper position of the rotor distributor, thereby causing inconvenience to workers.

SUMMARY OF THE INVENTION

Therefore, the present invention has been made in view of the above problems, and it is an object of the present invention to provide a separable distribution rotor having a simple structure, which improves sealing efficiency thereof and is conveniently attachable to and detachable from another unit for easy repair and maintenance, and a horizontal rotor distributor having the same.

In accordance with one aspect of the present invention, the above and other objects can be accomplished by the provision of a separable distribution rotor for a horizontal rotor distributor for distributing gas, said distribution rotor comprising: a first distribution rotor including a purge air supply opening and a treated gas discharge opening; a second distribution rotor including an untreated gas supply opening, a purge air supply opening and a treated gas discharge opening; and an elastic member interposed between the first distribution rotor and the second distribution rotor.

The distribution rotor having the above simple structure has high sealing efficiency.

In accordance with another aspect of the present invention, there is provided a horizontal rotor distributor for distributing gas, comprising: a first housing including a purge air supply duct and a treated gas discharge duct; a second housing disposed between the first housing and a distribution pipe and including an untreated gas supply duct; a distribution rotor disposed in the second housing and provided with an untreated gas supply opening, a purge air supply opening and a treated gas discharge opening; and a shaft, rotatably supported by the first housing, for rotating the distribution rotor, wherein the distribution rotor includes a first distribution rotor, a second distribution rotor, and an elastic member interposed between the first distribution rotor and the second distribution rotor.

With the above constitution, the first distribution rotor and the second distribution rotor are pressingly attached to the first housing and a distribution pipe by the elastic member, thereby improving the sealing efficiency of the distribution rotor. Further, when the force for coupling the first housing and the second housing is released, the first housing is easily separated from the second housing by the pushing action of the first distribution rotor.

Preferably, rollers may be installed on the first housing so as to serve as support bases of the first housing as well as to facilitate the pushing action of the first housing, thereby allowing the center of the shaft to be automatically aligned to proper positions of the first and second distribution rotors when the first and second distribution rotors are assembled into the distribution rotor.

Further, preferably, a strip may be interposed between the first distribution rotor and the second distribution rotor, thereby reliably sealing a gap between the first distribution rotor and the second distribution rotor.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the annexed drawings.

A horizontal rotor distributor in accordance with the preferred embodiment of the present invention is in communication with a distributor of the above-described regenerative thermal oxidizer, and is employed in "Waste heat recovery apparatus for improving heat recovery efficiency by distributing effect of symmetrically operating rotor (Korean Patent Application No. 2003-13311)" and "Equipment for concentrating organic solvent (Korean Patent Application No. 2003-13312)".

Figure 1:
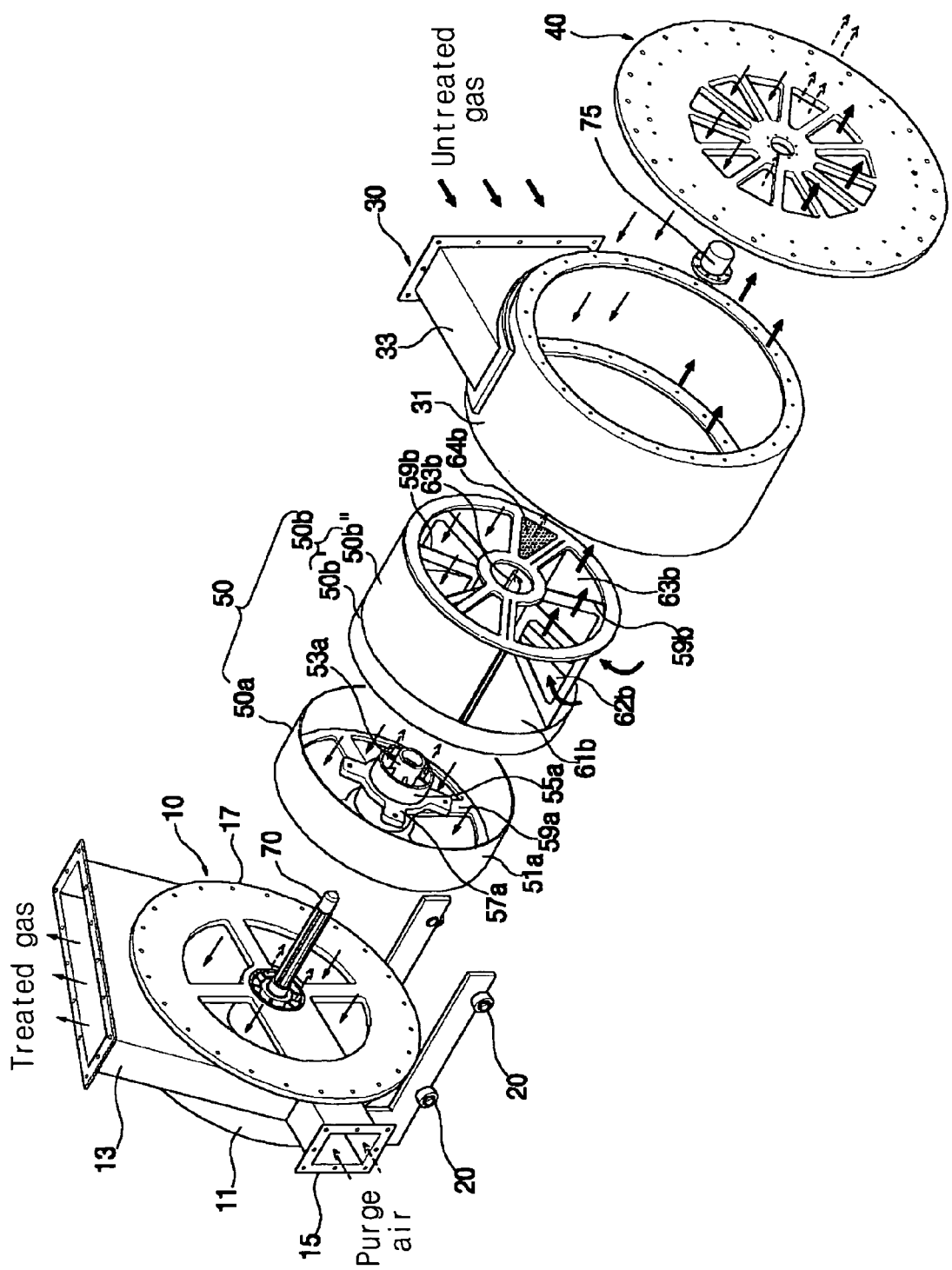
FIG. 1 is an exploded perspective view of a horizontal rotor distributor in accordance with a preferred embodiment of the present invention.
Figure 2:
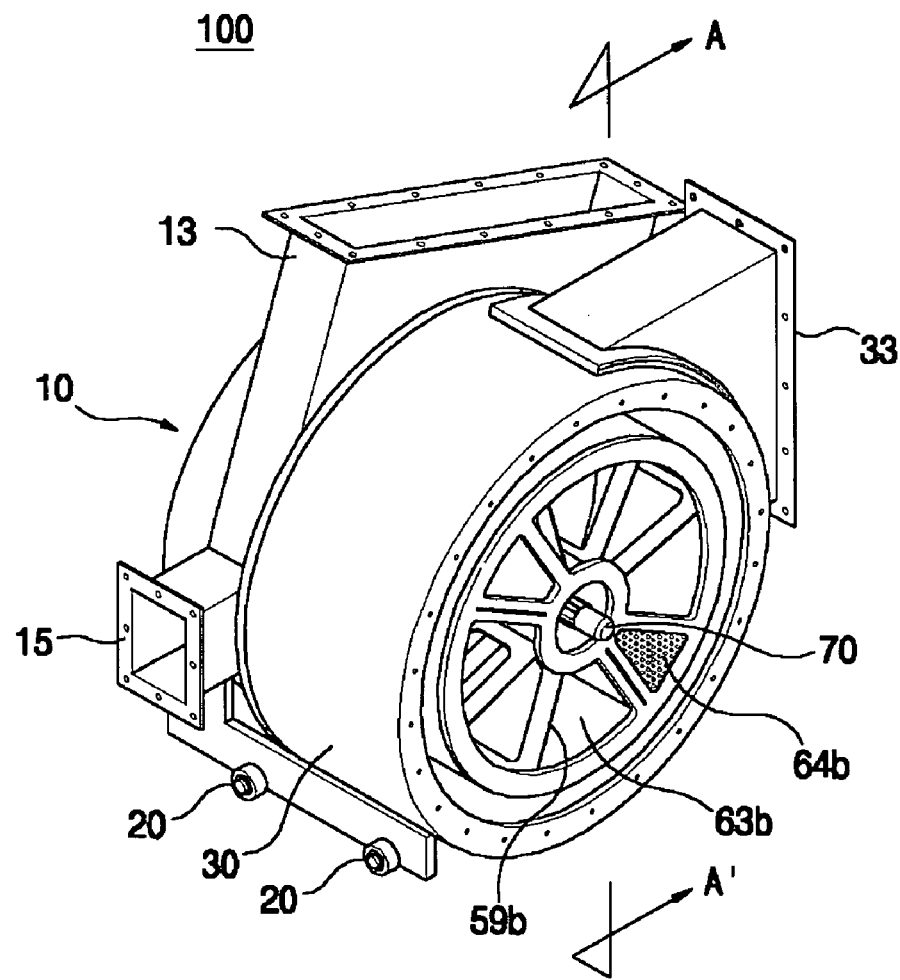
FIG. 2 is an assembled perspective view of the horizontal rotor distributor of FIG. 1.
Figure 3:
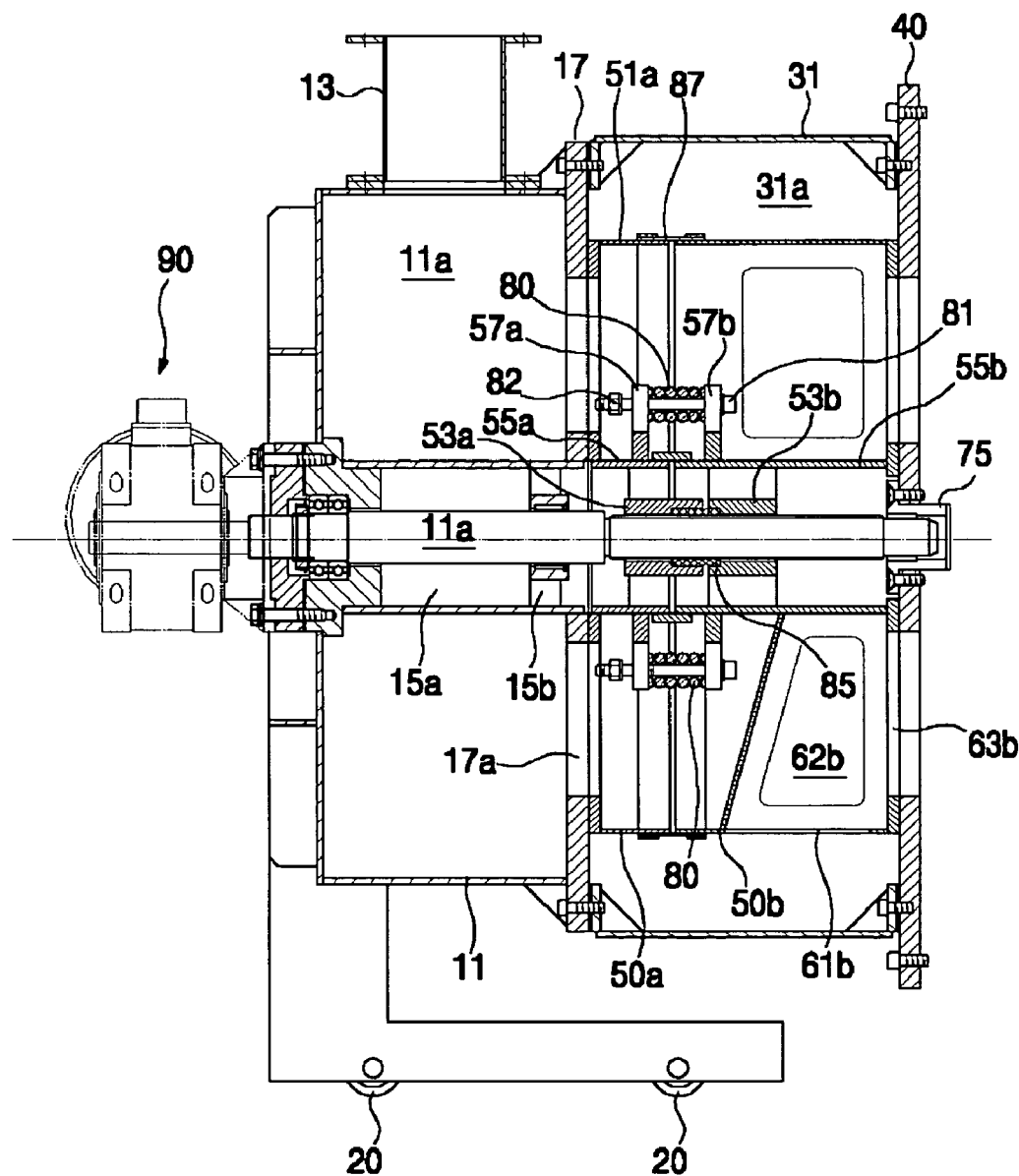
FIG. 3 is a cross-sectional view of the horizontal rotor distributor taken along the line A–A'.
Figure 4:
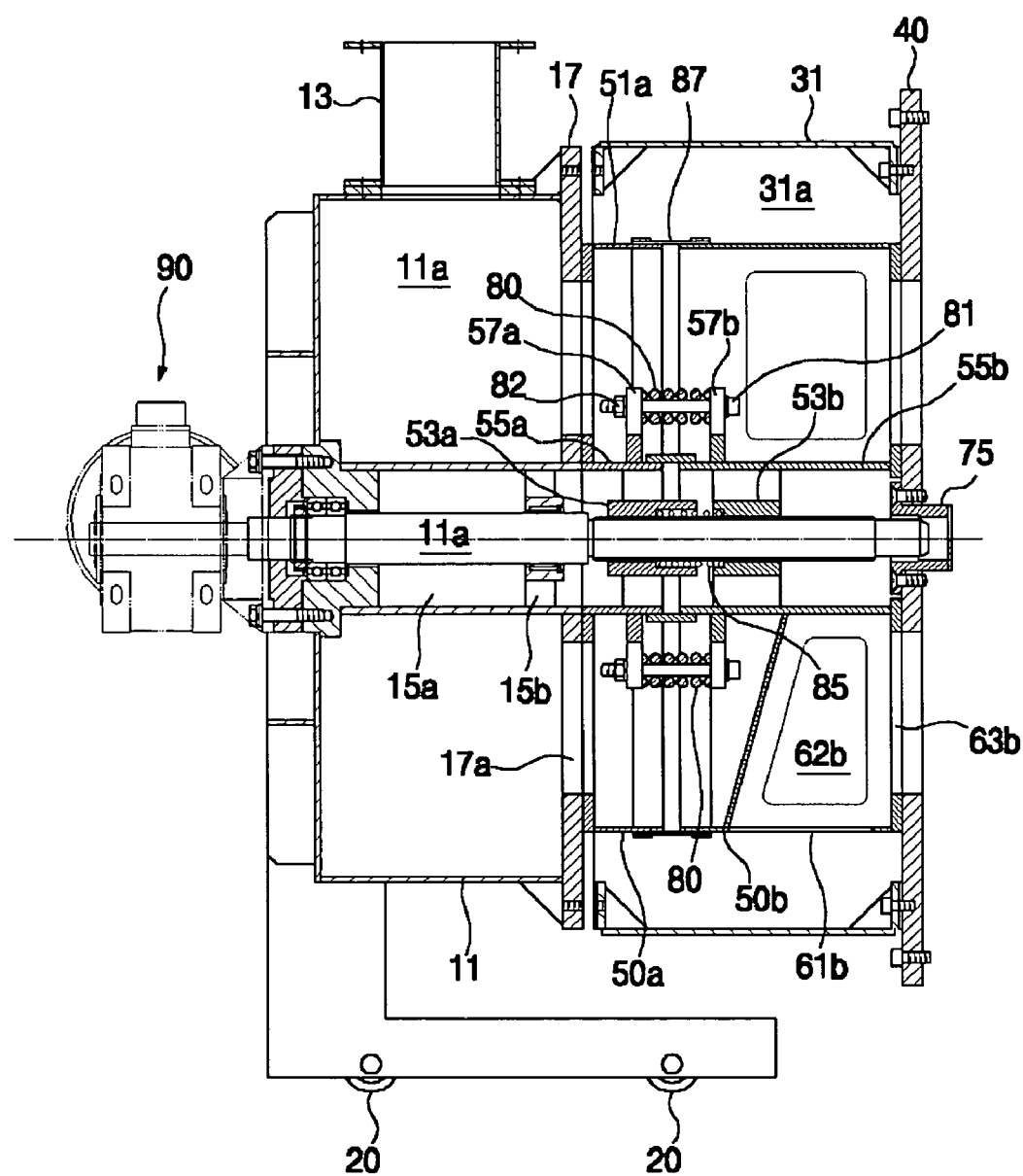
FIG. 4 is a cross-sectional view of the horizontal rotor distributor of FIG. 3, in which a first housing is pushed out so as to be distant from a second housing.

FIG. 1 is an exploded perspective view of a horizontal rotor distributor in accordance with a preferred embodiment of the present invention. FIG. 2 is an assembled perspective view of the horizontal rotor distributor of FIG. 1, FIG. 3 is a cross-sectional view of the horizontal rotor distributor taken along the line A–A', and FIG. 4 is a cross-sectional view of the horizontal rotor distributor of FIG. 3, in which a first housing is pushed out so as to be distant from a second housing.

As shown in FIGS. 1 to 4, the horizontal rotor distributor 100 of the present invention comprises a first housing 10, a second housing 30, a distribution rotor 50, placed on the second housing 30, including a first distribution rotor 50a and a second distribution rotor 50b, an elastic member 80 interposed between the first distribution rotor 50a and the second distribution rotor 50b, and a shaft 70 for supporting the distribution rotor 50. The shaft 70 receives rotary force transmitted from an operating unit 90, and rotates the distribution rotor 50 using the rotary force.

The first housing 10 includes a first casing 11 including a treated gas discharge chamber 11a provided with one side surface opened, a treated gas discharge duct 13 communicating with the treated gas discharge chamber 11a of the first casing 11, and a purge air supply duct 15 placed in the treated gas discharge chamber 11a. A flange 17 provided with treated gas discharge holes spaced from each other by designated intervals is installed above the front surface of the first casing 11, and the purge air supply duct 15 is fixed onto the flange 17. Shaft holes are respectively formed through the center of the first casing 11 and one end of the purge air supply duct 15, thereby rotatably supporting the shaft 70, which will be described later. Purge air supply holes 15b, which are spaced from each other by designated intervals, are formed through the purge air supply duct 15 around the shaft hole, and communicate with a purge air supply chamber 15a.

The second housing 30 includes a second casing 31 including an untreated gas supply chamber 31a provided with both side surfaces opened, and an untreated gas supply duct 33 communicating with the untreated gas supply chamber 31a of the second casing 31. One side surface of the second casing 31 is connected to the flange 17 of the first casing 11, and the other side surface of the second casing 31 is connected to a distribution plate 40 fixedly connected to a distribution pipe of a regenerative thermal oxidizer. The distribution plate 40, as shown in FIG. 1, is provided with a plurality of openings, each of which has a sector form, corresponding to a distribution chamber of the distribution pipe, thereby distributing and guiding untreated gas, purge air and treated gas.

The distribution rotor 50 is internally separated into the first and second distribution rotors 50a and 50b placed on the second casing 31. The first distribution rotor 50a includes a cylindrical body 51a, an axial portion 53a disposed at the center of the cylindrical body 51a and spline-coupled with the shaft 70, a purge air supply pipe 55a installed on the outer circumference of the axial portion 53a and communicating with the purge air supply holes 15b, and first coupling portions 57a formed on the outer circumference of the purge air supply pipe 55a. The purge air supply pipe 55a and the cylindrical body 51a are connected to each other by arms 59a. Treated gas passes through gaps between the neighboring arms 59a.

In the same manner as the first distribution rotor 50a, the second distribution rotor 50b includes a cylindrical body 51b, an axial portion 53b disposed at the center of the cylindrical body 51b and spline-coupled with the shaft 70, a purge air supply pipe 55b installed on the outer circumference of the axial portion 53b and communicating with the purge air supply pipe 55a, and second coupling portions 57b formed on the outer circumference of the purge air supply pipe 55b. The purge air supply pipe 55b and the cylindrical body 51b are connected to each other by arms 59b. Untreated gas, purge air and treated gas pass through gaps between the neighboring arms 59b.

The cylindrical body 51b includes a portion 50b' provided with the second coupling portions 57b, and a remainder portion 50b" formed integrally with the portion 50b'. Here, the interface between the portion 50b' and the portion 50b" is divided into a sealed part and an opened part. A communication hole 61b communicating with the untreated gas supply chamber 31a is formed through the outer circumference of the portion 50b" at the sealed part. The communication hole 61b also communicates with through holes 62b and supply holes 63b formed through the arms 59b. The outer circumference of the portion 50b" at the opened part is sealed, and the front and rear parts of the portion 50b" at the opened part are opened.

In the sealed and opened parts, as shown in FIG. 1, a part over a purge air supply portion 64b (made of a porous plate) and its symmetrical portion (made of a solid plate) is opened at front and rear parts thereof, and a lower part under the purge air supply portion 64b and its symmetrical portion is opened at circumferential and rear parts thereof. The purge air supply portion 64b communicates with a purge air supply hole 15b formed through the inner circumference of the purge air supply pipe 55b. Purge air is discharged only through the porous plate at a portion symmetrical to the purge air supply portion 64b. That is, the portion, symmetrical to the purge air supply portion 64b, except for the porous plate is sealed.

The elastic member 80, which is interposed between the first coupling portions 57a and the second coupling portions 57b, is supported by bolts 81. The first coupling portions 57a and the second coupling portions 57b are constructed such that they are slidable against the bolts 81. Further, nuts 82 serving as stoppers of the first coupling portions 57a are coupled with the bolts 81.

In the above structure of the elastic member 80, the nuts 82 are coupled with the bolts 81 so that there is a gap between the first distribution rotor 50a and the second distribution rotor 50b (with reference to FIG. 4). Thereafter, when the first housing 10 is pushed toward the second housing 30, the first distribution rotor 50a is pushed toward the second distribution rotor 50b so that the elastic member 80 is compressed as shown in FIG. 3. When the first housing 10 is coupled with the second housing 30 under the above compressed state, the first distribution rotor 50a and the second distribution rotor 50b are elastically supported by the elastic member 80, thereby causing the operation of the distribution rotor 50 under the condition that the distribution rotor 50 is pressingly attached to the distribution plate 40 and the flange 17, and improving the sealing efficiency of the distribution rotor 50. Further, in order to reinforce the elastic force of the elastic member 80, it is preferable that springs 85 be respectively installed at the axial portions 53a and 53b.

On the other hand, in case that the distribution rotor 50 is disassembled so as to clean or repair the distribution rotor 50, when the coupling of the first housing 10 and the second housing 30 is released, the first distribution rotor 50a pushes the first housing 10 so as to be distant from the second housing 30 by the distribution plate 40 providing repulsive force of the elastic force, thereby separating the first housing 10 from the second housing 30 as shown in FIG. 4. When the first housing 10 is eliminated from the second housing 30 under this state, the distribution rotor 50 is simply exposed to the outside, thus being conveniently cleaned and repaired for maintenance.

In order to facilitate the attachment and detachment of the first housing 10 and the second housing 30, preferably, rollers 20 are installed on the first casing 11 of the first housing 10. More preferably, the rollers 20 are installed at positions coinciding with the center of the shaft 70 and the center of the second housing 30 or the center of the distribution plate 40. This improves the efficiency of attaching and detaching the first and second distribution rotors 50a and 50b to each other.

Preferably, a strip 87 is interposed between the first distribution rotor 50a and the second distribution rotor 50b. The strip 87 closes the gap between the first distribution rotor 50a and the second distribution rotor 50b, or a gap generated therebetween due to the abrasion of the first and second distribution rotors 50a and 50b during operation, thereby improving the sealing efficiency of the distribution rotor 50.

The shaft receives the rotary force of the operating unit 90, and rotates the distribution rotor 50 using the rotary force. In order to reliably transmit the rotary force of the operating unit 90 and perform the separation of the distribution rotor 50 by means of the elastic force as described above, preferably, the shaft 70 is a spline shaft. A front end of the shaft 70 is supported by a bearing housing 75 attached to the distribution plate 40.

As apparent from the above description, the present invention provides a separable distribution rotor and a horizontal rotor distributor having the same, which have several effects, as follows.

First, since the distribution rotor, provided with an untreated gas supply opening, a purge air supply opening and a treated gas discharge opening, includes a first distribution rotor, a second distribution rotor, and an elastic member interposed between the first distribution rotor and the second distribution rotor, when coupling elements for coupling a first housing, including a purge air supply duct and a treated gas discharge duct, and a second housing are loosened, the first distribution rotor pushes the first housing by means of the elastic force of the elastic member so as to facilitate the separation of the first housing from the second housing, thereby allowing the distribution rotor to be easily cleaned and repaired for maintenance, and the distribution rotor is rotated under the condition that the interface between the first distribution rotor and the first housing and the interface between the second distribution rotor and a distribution plate (or a distribution pipe) are sealed and the sealing therebetween is continuously maintained although the first and second distribution rotors are abraded during the rotation, thereby improving the sealing efficiency of the distribution rotor.

Second, rollers installed on the first housing facilitate the separation of the first housing from the second housing by the repulsive force to the elastic force of the elastic member, stably support a shaft because the rollers serve as supporting bases of the first housing, and automatically fit the center of the shaft to the center of the first housing, thereby improving efficiency of separating/coupling the first housing from/with the second housing.

Third, a strip interposed between the first distribution rotor and the second distribution rotor facilitates the sealing of a gap between the first distribution rotor and the second distribution rotor in case that there is the gap between the first distribution rotor and the second distribution rotor, for example when the first distribution rotor and the second distribution rotor are initially coupled with each other or abraded due to the rotation.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A separable distribution rotor for a horizontal rotor distributor for distributing gas, said distribution rotor comprising:
   a first distribution rotor including a purge air supply opening and a treated gas discharge opening;
   a second distribution rotor including an untreated gas supply opening, a purge air supply opening and a treated gas discharge opening; and
   an elastic member interposed between the first distribution rotor and the second distribution rotor.

2. The separable distribution rotor as set forth in claim 1, wherein a strip is interposed between the first distribution rotor and the second distribution rotor.

3. A horizontal rotor distributor for distributing gas, comprising:
   a first housing including a purge air supply duct and a treated gas discharge duct;
   a second housing disposed between the first housing and a distribution pipe, and including an untreated gas supply duct;
   a distribution rotor disposed in the second housing, and provided with an untreated gas supply opening, a purge air supply opening and a treated gas discharge opening; and
   a shaft, rotatably supported by the first housing, for rotating the distribution rotor,
   wherein the distribution rotor includes a first distribution rotor, a second distribution rotor, and an elastic member interposed between the first distribution rotor and the second distribution rotor.

4. The horizontal rotor distributor as set forth in claim 3, wherein rollers are installed on the first housing.

5. The horizontal rotor distributor as set forth in claim 4, wherein a strip is interposed between the first distribution rotor and the second distribution rotor.

6. The horizontal rotor distributor as set forth in claim 3, wherein a strip is interposed between the first distribution rotor and the second distribution rotor.

* * * * *